United States Patent

[11] 3,570,515

[72] Inventor Hans-Dieter Kinner
Attleboro, Mass.
[21] Appl. No. 834,784
[22] Filed June 19, 1969
[45] Patented Mar. 16, 1971
[73] Assignee The Foxboro Company
Foxboro, Mass.

[54] LAMINAR STREAM CROSS-FLOW FLUID DIFFUSION LOGIC GATE
4 Claims, 8 Drawing Figs.

[52] U.S. Cl. .......... 137/81.5
[51] Int. Cl. .......... F15c 1/18, F15c 1/12
[50] Field of Search .......... 137/81.5; 235/201 (p.f.) (sens. gen.)

[56] References Cited

UNITED STATES PATENTS

| | | | |
|---|---|---|---|
| 3,080,886 | 3/1963 | Severson | 137/81.5 |
| 3,362,421 | 1/1968 | Schaffer | 137/81.5 |
| 3,366,131 | 1/1968 | Swartz | 137/81.5 |
| 3,369,557 | 2/1968 | Wood | 137/81.5 |
| 3,444,876 | 5/1969 | Sieracki et al. | 137/81.5 |
| 3,486,692 | 12/1969 | Ahern | 137/81.5(X) |
| 3,495,608 | 2/1970 | O'Keefe | 137/81.5 |
| 3,500,847 | 3/1970 | Doherty | 137/81.5 |

*Primary Examiner*—Samuel Scott
*Attorney*—Lawrence H. Poeton

ABSTRACT: A fluid logic gate wherein two laminar streams are intersected in a diffusion area, with a control jet applicable to each of the laminar streams upstream of the intersection, with an output from the diffusion area in alignment with each of the streams, on the logic basis of zero output when the control jets are either both on or both off.

3 Sheets-Sheet 1

FIG. I

INVENTOR.
HANS-DIETER KINNER
BY
Lawrence H. Poston
AGENT

INVENTOR.
HANS-DIETER KINNER
BY Lawrence H. Poston
AGENT

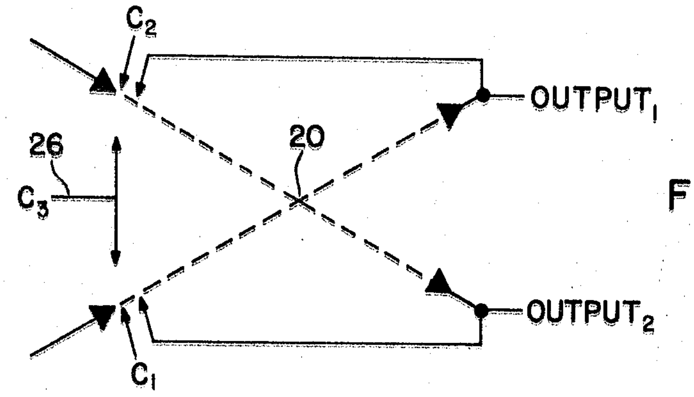
FIG. 5
| | C1 | C2 | C3 | $\overline{C}$ |
|---|---|---|---|---|
| O1 | 0 | 1 | 0 | 0 |
| O2 | 1 | 0 | 0 | 0 |
FIG. 6
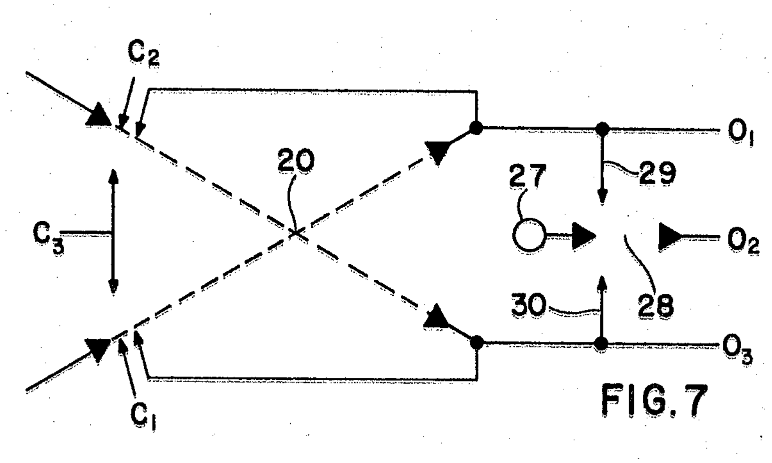
FIG. 7
| | C1 | C2 | C3 | $\overline{C}$ |
|---|---|---|---|---|
| O1 | 0 | 1 | 0 | 0 |
| O2 | 0 | 0 | 1 | 1 |
| O3 | 1 | 0 | 0 | 0 |
FIG. 8
INVENTOR.
HANS-DIETER KINNER
BY
Lawrence A. Foster
AGENT

LAMINAR STREAM CROSS-FLOW FLUID DIFFUSION LOGIC GATE

This invention relates to logic devices, and has particular reference to fluid logic devices based on laminar diffusion phenomena.

In such devices an input passage is provided which is suitable and sufficient to establish a laminar stream. This laminar stream is projected across an open space, into an output passage. A transverse control jet input is provided, to direct a fluid control jet against the laminar stream while this stream is in free flow across the open space. The result of such impingement is diffusion of the laminar stream, and significant reduction of fluid flow in the output. In this form, the output is logic one or zero, one if the stream is uninterrupted, and zero is the stream is diffused.

Such diffusion devices are desirable and useful in that they can be made very sensitive to small control signals, can be formed to use little air, are simple in construction and lend themselves to operative association with many other such devices in small space, in keeping with the important modern trends to miniaturization. Further, such devices can be built in thin sandwich form for compactness and ease of construction.

This invention lends itself to such sandwich construction as exemplified in U.S. Pat. No. 3,416,551 to Kinner. These devices have no moving parts and can be constructed essentially in a single plane.

In the applications of fluid logic devices it becomes increasingly important to reduce the size of the various elements, and to increase the function effectiveness of each element, in order to provide fluid logic function more efficiently.

One such function is gating, and a specific form of gating is known as "exclusive OR" logic gating. Such a device compares two inputs. If they are different, there is an output, logic "one." If they are the same, positive, negative, or zero, there is no output, that is, logic "zero."

The fluid logic devices according to this invention provide an element which can be used as an "exclusive OR" logic gate. It is based on two laminar streams, which, when both are present, intersect and diffuse, resulting in "zero" output. These streams may both be diffused upstream of the intersection point, resulting also in "zero" output. A "one" output is accomplished when only one of the streams is diffused upstream and the other proceeds uninterrupted.

The laminar stream intersect point is well within a diffusion area and significantly upstream of output passages so that intersection diffusion results in "zero" output in both outputs. Further, within the diffusion area each stream is protected from individual control signal diffusion of the other, by shields or dividers, and/or by configuration of the diffusion area and/or placement and direction of the laminar streams in free flow across the open diffusion area to outputs individual to the laminar streams. Each output thus is in logic "one" condition only when the other is in logic "zero" condition.

Other and various uses and forms of this invention are readily accomplished from the basic consideration of an element in which two laminar fluid streams may intersect and diffuse each other while in free flow in an open space.

Other objects and advantages of this invention will be in part apparent and in part pointed out hereinafter and in the accompanying drawings, in which:

FIG. 1 is a top view of a thin sandwich plate incorporating the logic system according to this invention for use in sandwich structure like that of U.S. Pat. No. 3,416,551 to Kinner;

FIGS. 5 and 7 are examples of tristable systems according to this invention; and FIGS. 6 and 8 are truth tables respectively of the systems of FIGS. 5 and 7.

Figure 2:
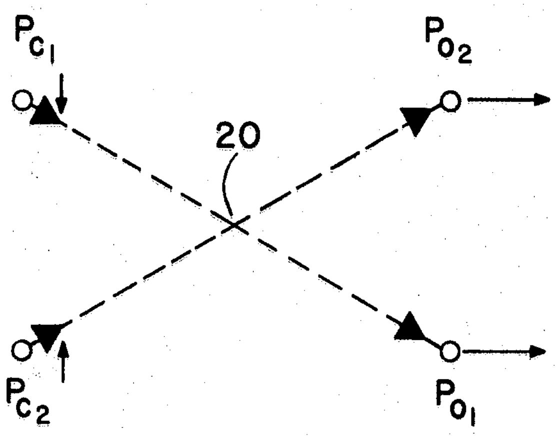
FIG. 2 is a logic element schematic illustration of the system of FIG. 1.

As illustrated in FIG. 2, $Pc_1$ and $Pc_2$ are control pressures, and $P_{01}$ and $P_{02}$ are output pressures. Throughout the other drawings, for convenience, these symbols are shortened to $C_1$, $C_2$, $O_1$, $O_2$, etc.

Figure 1:
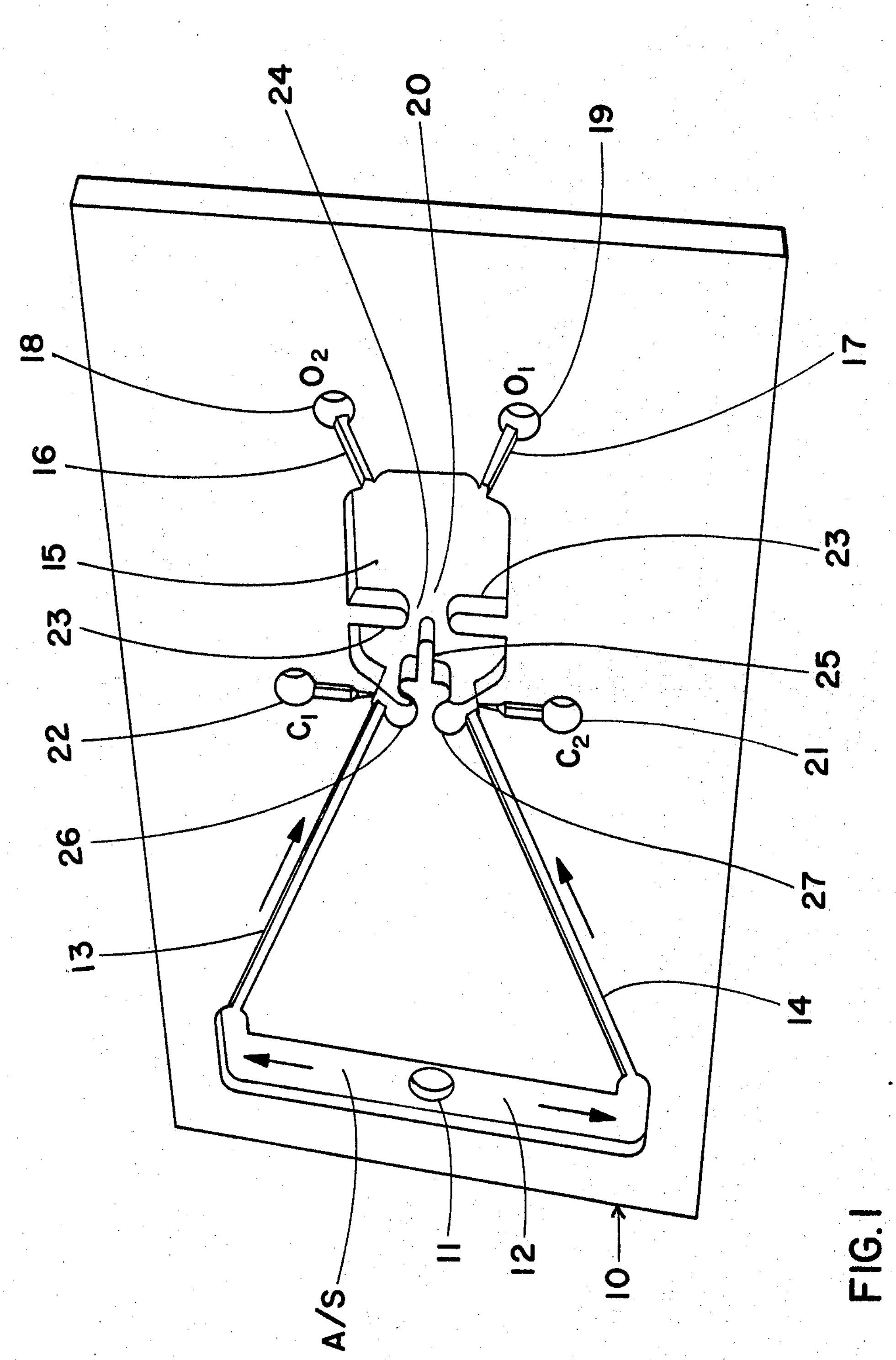

The structure of FIG. 1 is a thin plate with various fluid passages and openings therein. This plate is used as the central plate of a sandwich assembly of the nature of the sandwich structure of the U.S. Pat. No. 3,416,551 to Kinner.

The FIG. 1 plate comprises a body 10 with an air supply input passage 11 at the left, leading into a transverse slot 12 as an air supply manifold. From each end of the manifold 12, fluid stream input slots 13 and 14 extend toward each other and to the right, like the sides of a triangle. The various slots described herein, in sandwich assembly, are closed by a cover plate (not shown) and thus become cross-sectionally closed passages.

The FIG. 1 input slots 13 and 14 open, at their right-hand ends, into a diffusion opening generally indicated at 15. This opening is in the form of a vent area, usually directly open to atmosphere, as a vent for fluid in the system in diffused condition. The slots 13 and 14 are formed to provide passages capable in length and form to establish laminar flow in fluid passing therethrough in the context of the nature, volume and pressures of a particular application. Accordingly, fluid streams entering the diffusion, vent area 15 are in laminar form, with sufficient force to maintain the laminar condition, if uninterrupted, fully across the diffusion area 15, into output slots 16 and 17, individual respectively to input slots 14 and 13. The output slots 16 and 17 terminate respectively in output passages 18 and 19.

Further, in FIG. 1, laminar fluid streams in free flow across the diffusion area 15 from the inputs 13 and 14, are arranged to intersect at a central point 20, within the diffusion area 15. When these streams do thus impinge on each other, both are broken out of their laminar condition into diffusion, and flow into the outputs 16 and 17 is negligible, that is, logic "zero." Logic "zero" is the output condition in both 16 and 17, also, when both laminar streams are diffused upstream of the intersection point 20.

Such individual diffusion is accomplished by fluid control jet inputs 21 and 22. Each of these inputs is from a suitable control signal source (not shown) and they are located adjacent the openings of inputs 13 and 14 into the diffusion area 15. Control jets are applied through inputs 21 and 22 transversely to the laminar streams and produce diffusion conditions to break up the laminar streams so no significant flow reaches the outputs 16 and 17.

Accordingly, when $C_1$ and $C_2$, control inputs 22 and 21, are both on, both the laminar streams are diffused and both outputs $O_1$ (19) and $O_2$ (18) are logic "zero." . Also with $C_1$ and $C_2$ both off, the laminar streams are uninterrupted by control signals, but go on to intersect at point 20, and so diffuse each other as to also register logic "zero" in both outputs $O_1$ and $O_2$.

On the other hand, when $C_1$ is on and $C_2$ is off, the stream from input 13 is diffused, but the stream from input 14 is uninterrupted. The result is logic "one" in output 18 ($O_2$) and logic zero in output 19 ($O_1$). Similarly, with $C_2$ "on" and $C_1$ "off," the result is logic "zero" in output 18 ($O_2$) and logic "one" in output 19 ($O_1$).

The mutual diffusion of both laminar streams at point 20 with $C_1$ and $C_2$ both "off," is sufficient unto itself, and no special protection is needed between the streams. It is only necessary that they remain laminar, and that the point 20 be well within the vent area 15, a significant distance upstream from the outputs 16 and 17 so that the mutual diffusion will in fact result in logic "zero" in both $O_1$ and $O_2$.

However, the diffusion of the streams by the control inputs requires that a stream to which no control signal is applied, must be protected from diffusion created in the other stream by a control signal applied to that other stream. This may be accomplished by shields, or separators, or configuration of the walls of the vent area 15, or combinations of these.

As one example of such protection, FIG. 1 illustrates a pair of separators 23 from the sidewalls of the vent area 15 outward the center, leaving a space 24 through which the laminar streams may pass. Further, a shield 25 is located between the laminar streams, extending toward the stream intersection point 20. Further, bay areas 26 and 27 are provided in the vent area 15 and respectively opposite control inputs 22 ($C_1$) and 21 ($C_2$). These bays absorb and control diffusion of the laminar streams as caused by the control signals. Thus each control signal has its own diffusion area, and control signal diffusion of one laminar stream is not able to impinge on the other laminar stream. Thus one stream may be diffused by a control signal while the other stream continues uninterrupted past the intersection point 20 and into its respective output, assuming no control signal on this other stream.

Accordingly, assuming both laminar streams to be present, and $C_1$ and $C_2$ absent, the streams intersect at 20 and $O_1$ and $O_2$ are both "zero." If $C_1$ and $C_2$ are both present, both streams are diffused locally, to the control inputs, and $O_1$ and $O_2$ are again both "zero." If $C_1$ is present and $C_2$ absent, $O_2$ is "one" and $O_1$ is "zero." Finally, $O_2$ is "zero" and $O_1$ is "one" if $C_1$ is absent and $C_2$ present.

FIG. 2 is a schematic representation of the system of FIG. 1.

Figure 3:
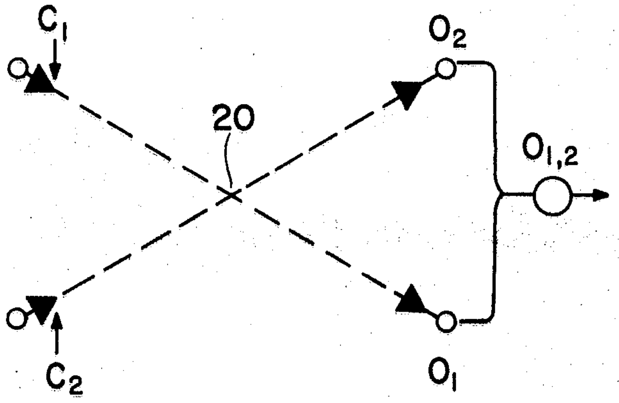
FIG. 3 is a logic system schematic in the form of an "exclusive OR" gate according to this invention.

FIG. 3 is FIG. 2 with a connection between $O_2$ and $O_1$ to provide a single output $O_{1,2}$. This is an "exclusive OR" logic gate wherein either $C_1$ or $C_2$ by itself will produce a logic "one" output in $O_{1,2}$. When both $C_1$ and $C_2$ are on, or both $C_1$ and $C_2$ are off, $O_{1,2}$ is "zero."

Figure 4:
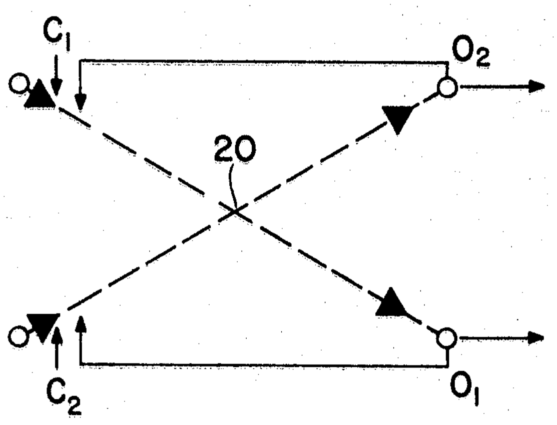
FIG. 4 is a flip-flop element based on the system of this invention.

FIG. 4 illustrates a flip-flop element, accomplished by feedback connections from $O_1$ to $C_2$ and from $O_2$ to $C_1$.

In FIGS. 5, 6, 7, and 8, the symbols C and O are rearranged for convenience.

FIG. 5 is a tristable system, using the system of FIG. 4 as an example, and adding a control input 26, simultaneously applicable to both laminar streams. A truth table for the FIG. 5 system is shown as FIG. 6.

FIG. 7 is another form of a tristable system using the system of FIG. 5 as an example, and adding an output system with secondary diffusion gate having a fluid source 27, a free flow open area 28 for a laminar fluid stream from the source 27, an output $O_2$, and control inputs 29 and 30 from the outputs of the primary diffusion gate. A truth table for the FIG. 7 system is shown as FIG. 8. It is notable that memory function is provided in that each system remains in its last position.

This invention, therefore, provides a new and useful fluid logic gate, based on fluid stream laminar-diffusion effects, and on an intersection pattern of laminar streams in freeflow condition.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

I claim:

1. A laminar stream crossflow fluid diffusion logic gate wherein two laminar streams in free flow are directed to intersect each other in a diffusion opening wherein a diffusing control jet applied to either of said streams prior to said intersection results in uninterrupted passage of the other of said streams through said opening, and wherein diffusing control jets applied to both of said streams or absence of diffusing control jets to both of said streams both results in interruption of passage of both of said streams through said diffusion opening;

said gate comprising a diffusion opening;

a pair of laminar flow stream inputs to said diffusion opening, directed for mutual diffusing intersection of laminar flow streams from said inputs at a point within said diffusion opening;

outputs means from said diffusion opening comprising an output aligned with each of said laminar streams for receiving its respective laminar stream when that respective stream is uninterrupted, and control input means into said diffusion opening for application of a control jet to each of said laminar streams in free flow, to individually diffuse said streams at a point on each of said streams upstream of said intersection, said intersection point being located a significant distance upstream of each of said output means whereby intersection of said streams results in diffusion of both, and in significant reduction of fluid flow in both said output means, and said flow stream inputs, their respective control input means and said diffusion opening being disposed with respect to each other such that diffusion of one of said streams by its control jet is accomplished without interruption of the other of said streams; and said diffusion opening comprises a large downstream chamber and two upstream chambers each individual to a different one of said laminar streams, said chambers being separated except for passages for said laminar streams, by a pair of transverse separator walls, extending transversely of said opening from the sidewall thereof, and a shield wall between said two upstream chambers.

2. A laminar stream crossflow fluid diffusion logic gate wherein two laminar streams in free flow are directed to intersect each other in a diffusion opening wherein a diffusing control jet applied to either of said streams prior to said intersection results in uninterrupted passage of the other of said streams through said opening, and wherein diffusing control jets applied to both of said streams or absence of diffusing control jets to both of said streams both results in interruption of passage of both of said streams through said diffusion opening;

said gate comprising a diffusion opening;

a pair of laminar flow stream inputs to said diffusion opening, directed for mutual diffusing intersection of laminar flow streams from said inputs at a point within said diffusion opening;

output means from said diffusion opening comprising an output aligned with each of said laminar streams for receiving its respective laminar stream when that respective stream is uninterrupted, and control input means into said diffusion opening for application of a control jet to each of said laminar streams in free flow, to individually diffuse said streams at a point on each of said streams upstream of said intersection, said intersection point being located a significant distance upstream of each of said output means whereby intersection of said streams results in diffusion of both, and in significant reduction of fluid flow in both said output means, and said flow stream inputs, their respective control input means and said diffusion opening being disposed with respect to each other such that diffusion of one of said streams by its control jet is accomplished without interruption of the other of said streams; and said gate in the form of a flip-flop unit wherein feedback control passages are provided from each of said outputs to a control input of the opposite laminar stream, upstream of the point of intersection of said streams.

3. A laminar stream crossflow fluid diffusion logic gate wherein two laminar streams in free flow are directed to intersect each other in a diffusion opening wherein a diffusing control jet applied to either of said streams prior to said intersection results in uninterrupted passage of the other of said streams through said opening, and wherein diffusing control jets applied to both of said streams or absence of diffusing control jets to both of said streams both results in interruption of passage of both of said streams through said diffusion opening;

said gate comprising a diffusion opening, a pair of laminar flow stream inputs to said diffusion opening, directed for mutual diffusing intersection of laminar low streams from said inputs at a point within said diffusion opening;

output means from said diffusion opening comprising an output aligned with each of said laminar streams for receiving its respective laminar stream when that respective stream is uninterrupted, and control input means into said diffusion opening for application of a control jet to each of said laminar streams in free flow, to individually diffuse said streams at a point on each of said streams upstream of said intersection, said intersection point being located a significant distance upstream of each of said output means whereby intersection of said streams results in diffusion of both, and in significant reduction of fluid flow in both said output means, and said flow stream inputs, their respective control input means and said diffusion opening being disposed with respect to each other such that diffusion of one of said streams by its control jet is accomplished without interruption of the other of said streams;

said gate in the form of a flip-flop unit wherein feedback control passages are provided from each of said outputs to a control input of the opposite laminar stream, upstream of the point of intersection of said streams; and said gate being a tristable logic element with an additional single control input provided for simultaneous control application to both said laminar streams, within said diffusion opening and upstream of said intersection.

4. A laminar stream crossflow fluid diffusion logic gate wherein two laminar streams in free flow are directed to intersect each other in a diffusion opening wherein a diffusing control jet applied to either of said streams prior to said intersection results in uninterrupted passage of the other of said streams through said opening, and wherein diffusing control jets applied to both of said streams or absence of diffusing control jets to both of said streams both results in interruption of passage of both of said streams through said diffusion opening;

said gate comprising a diffusion opening;

a pair of laminar flow stream inputs to said diffusion opening, directed for mutual diffusing intersection of laminar flow streams from said inputs at a point within said diffusion opening;

output means from said diffusion opening comprising an output aligned with each of said laminar streams for receiving its respective laminar stream when that respective stream is uninterrupted, control input means into said diffusion opening for application of a control jet to each of said laminar streams in free flow, to individually diffuse said streams at a point on each of said streams upstream of said point of mutual diffusing intersection, said mutual intersection point being located a significant distance upstream of each of said output means whereby intersection of said streams results in diffusion of both, and in significant reduction of fluid flow in both said output means, and said flow stream inputs, their respective control input means and said diffusion opening being disposed with respect to each other such that diffusion of one of said streams by its control jet is accomplished without interruption of the other of said streams;

an individual diffusion chamber and outlet at each of said individual diffusion points of each of said streams upstream of said mutual intersection diffusion point, such that simultaneous application of both said control jets results in diffusion of each of said streams into its individual diffusion chamber to reduce flow in both said outputs from said diffusion opening essentially to zero; and a pair of separator members extending into said diffusion opening from the sidewalls thereof and toward each other, downstream of said control jets and upstream of said stream mutual intersection diffusion point, and a shield extending downstream between the flow paths of said laminar streams to a point between said separator members, whereby each of said streams is protected from the other when said other is diffused upstream by its control jet.